United States Patent [19]

Schwenk et al.

[11] 4,390,568

[45] Jun. 28, 1983

[54] LINING A STEEL PIPE INTERNALLY WITH A CEMENT MORTAR

[75] Inventors: Wilhelm Schwenk; Bruno Heinrich, both of Duisburg; Rolf Mangen, Mülheim, all of Fed. Rep. of Germany

[73] Assignee: Mannesmannufer Aktiengesellschaft, Duesseldorf, Fed. Rep. of Germany

[21] Appl. No.: 244,708

[22] Filed: Mar. 17, 1981

[30] Foreign Application Priority Data

Mar. 17, 1980 [DE] Fed. Rep. of Germany ....... 3010525

[51] Int. Cl.³ .......................... B05D 7/22; B05D 3/12
[52] U.S. Cl. .................................... 427/234; 427/231; 427/240
[58] Field of Search ..................... 427/231, 234, 240

[56] References Cited

FOREIGN PATENT DOCUMENTS 2620669 11/1977 Fed. Rep. of Germany .

OTHER PUBLICATIONS

Heinrich et al., "Untersuchungen der Korrosionsschutzeigenschaften vonZementmörtelauskleidunger für Stahlrohre" Mannesmann Forschungsberichte (1978).
"Werkseitig hergestellte Zementmörtel auskleidungen für Guss-und stahlrohre-Anforderungen und Prüfungen, Einsatzbereiche" Wasserversorgung Korrosionsschutz (1978).

Primary Examiner—James R. Hoffman
Attorney, Agent, or Firm—Ralf H. Siegemund

[57] ABSTRACT

A dispersion of a polymer such as an acrylic resin, and of a surface-acting resin, such as a melamine resin, is added to a cement mortar having a sand-to-cement ratio of 1 to 3 and a water-to-cement ratio of 0.25 to 0.35, the resin being preferably approximately 10 parts by weight per 100 parts of cement. This blend is applied to the interior of a pipe and the pipe is rotated at a speed which is gradually increased in order to produce at least approximately 20-g forces on the material for compacting same for a few minutes.

8 Claims, No Drawings

LINING A STEEL PIPE INTERNALLY WITH A CEMENT MORTAR

BACKGROUND OF THE INVENTION

The present invention relates to a method of making a corrosion-proof and corrosion-proofing layer on the inside surface of steel pipes.

Corrosion-proofing of water pipes by means of a cement mortar lining has been known for many years. This lining is usually applied by means of centrifugal force action. The resulting lining has, for instance, a water-to-cement ratio of 0.4 at a mixing ratio of sand to cement of approximately 2.5. The German Industry Standard, laid down in Paper W 342 of December 1978, sets forth requirements and test particulars for such a material, particularly when used in combination with drinking water.

One may use other methods of applying such a cement lining; decisive is that such a resulting cement mortar lining provides sufficient protection against corrosion. This is, indeed, true for most types of water; and pipe lines can in that manner be deemed completely corrosion-proof for most cases. However, water rich in carbon dioxide; industrial, acid-rich waste water; or salt water which contains additives being particularly aggressive to cement (e.g., magnesium salts or sulfates); all will corrode the cement and will slowly destroy the protective properties of steel pipes. The corrosion process involves, in particular, gradual dissolving of the calcium so that the mortar structure is disturbed and destroyed. This phenomenon was particularly observed where partially decalcinated mortar was permitted to dry. Temporary dryness is inevitable when, for instance, repairs and other maintenance is required. Here then, the mortar will loose directly some of its sand. Repetition of the wet-dry situation will gradually destroy the protection.

It has been suggested to improve the corrosion resistance of such mortar by adding, for example, organic polymer in a watery dispersion. However, a centrifugal application of the substance to a rotating pipe as per German paper W 342 mentioned above is not feasible because the synthetic dispersed in water will be removed by the centrifugal action.

German printed patent application No. 26 20 669 suggests casting the cement mortar against the inside wall of a non-rotating pipe by means of air pressure and under utilization of a rotating disk or distribution head. The mortar contains a synthetic dispersion, particularly for ensuring adhesion of the fresh mortar in the wall. This method, however, requires that, subsequently, the surface of the mortar layer be smoothed. Moreover, the material itself, as applied, is not adequately compacted. In the case of significant porosity with little or no compression, all reactions tending to dissolve the calcium are actually enhanced. A mortar blended with the dispersion of a synthetic will still decalcinate as fast as it would without the additive, but resistance against mechanical wear was noticably improved. See, for example, "MANNESMANN FORSCHUNGSBERICHTE" 770/1978, pp. 448-459.

It is a surprising discovery that significant compression of a synthetically alloyed mortar improves greatly its corrosion resistance, whereby particularly the strength of the mortar as well as its decalcination are involved.

DESCRIPTION OF THE INVENTION

It is an object of the present invention to provide a new and improved method of lining the interior of pipes with a compressed or compacted, highly corrosion-proof and corrosion-proofing material, particularly for protecting the pipe against acidic fluids.

In accordance with the preferred embodiment of the present invention, it is suggested to provide a blend of cement mortar with a sand-to-cement (weight) ratio of from 1 to 3, and a water-to-cement (weight) ratio of from 0.25 to 0.35, and of a dispersion of synthetic material in the water and including a synthetic polymer and a surface-active synthetic resin, the solid component of the dispersion being present at approximately 3 to 20 parts, preferably 10 parts, by weight per 100 parts by weight of cement. This blend is deposited inside the pipe, and the pipe is subjected to rotation, including high-speed rotation, in order to distribute and compact a mortar layer on that inside surface.

The preferred synthetic material is to be comprised of melamine resin and acrylic resin. Preferably, a puzzuolanic filler is to be included in the blend in order to enhance fluidity without the need of excessive amounts of water. The pipe should be rotated at first at a relatively low speed of from 140 to 240 RPM's (depending upon the diameter of the pipe) for providing an initial distribution, and later the speed is increased to 400 to 750 RPM's in order to obtain compacting. It was found advantageous to superimpose a radial vibration upon the pipe during rotation to further enhance compacting.

The synthetic polymer, particularly the acrylic resin if included, bonds the unorganic components of the mortar to each other, fills any voids and gaps, and is highly resistive (chemically) to alkaline reaction of the cement. Surface-reacting i.e., reactive resins are those which are absorbed on the surface of the cement and sand particles, causing the mortar to remain fluid, even if the water-to-cement ratio is rather small.

The conventional lining methods process cement mortar which, initially, has a water-to-cement ratio of at least 0.5. Such mortars cannot be blended with synthetic materials, as outlined above. It was found surprisingly that surface-active substances, such as melamine resin, permits the making of mortar with a water-to-cement ratio of well below 0.5, even below 0.35, for a sand-to-cement ratio of 2.5. These mortars are deposited initially by centrifugal action; and they contain already the synthetic dispersion. During centrifugal action, very little water (and, therefore, very little of the synthetic additive) is removed.

In order to obtain a very high compacting and compression action, with little or no separation of the components of the blend, one should superimpose a radial vibration upon the pipe. This shaking action combined with strong compacting forces minimizes any voids in the layer. The resulting water-to-cement ratios of the centrifugally distributed and compacted mortar is below the ratio of 0.35.

A particular example for practicing the invention will be described next.

First, cement and sand are mixed, at a weight ratio of 1:2.5. The cement and the sand have grain sizes of from 0.1 mm to 1.5 mm. Water is added at a quantity corresponding to a water-to-cement ratio (weight) of 0.32. The water, or a portion thereof, was previously used for providing a dispersion of synthetics, including a surface-acting component and an alkaline-resisting polymer. A puzzuolamic filler may also be included at a weight content of 5 parts to 30 parts per hundred parts cement.

This kind of filler generally improves the fluidity of the blend, prevents separation, and thus improves workability of the mortar. The filler, in fact, absorbs the synthetic components. In the preferred form, a so-called EFA filler is used which is captured flying dust from high-temperature refineries, and having been produced at temperatures of from 1000° C. to 1700° C. They contain glass of approximately 90% and exhibit puzzuolanic effect of 115%.

After the blend has been prepared, it is fed to the pipe, which is at rest or rotates slowly. The rotational speed is gradually increased during a period of from 1 minute to 3 minutes. At the end of the speed-increasing period, the maximum speed has been obtained and is maintained for a few minutes.

The maximum rotational speed for a pipe of particular diameter should be such that the centrifugal force in the mortar layer is at least 20 g (g being the per unit mass of gravitational acceleration), preferably more. Particularly during the startup and speed increase, but also during high-speed rotation, the pipe is subjected to radial vibrations which cause the particles of the material to settle in the compactest disposition in order to obtain maximum density. The centrifugal compacting action is terminated by slowing the pipe down over a period of approximately 1 minute, or thereabouts. Generally speaking, the rate of initial speed increase should at least be about the same as the (negative) rate of slowdown.

The example above is based on a sand-to-cement weight ratio of 2.5. In the case of a deviation (which should, nevertheless, remain within the range of from 2 to 3), correspondingly smaller or larger minimum values for the water-to-cement ratios should be observed. In other words, the proposed ratio ranges are preferably observed in a corresponding fashion; that is to say, smaller (larger) sand-to-cement ratios should preferably be used for smaller (larger) water-to-cement ratios.

The following particular composition was found to be very resistant to acidic and salty waste waters (all parts are given by weight):

| Part (Weight) | Material |
| --- | --- |
| 220 | Quartz sand, 0.1 mm to 1.5 mm, graded as per Fuller curve. |
| 50 | Quartz sand, H 31 |
| 96 | Portland cement, 45 F HS |
| 12 | ERA filler |
| 22 | Acrylic resin dispersion (50% solids) |
| 0.2 | Melamine condensation resin |
| 22 | Water |

The invention is not limited to the embodiments described above; but all changes and modifications thereof, not constituting departures from the spirit and scope of the invention, are intended to be included.

We claim:
1. The method of lining the interior of a steel pipe for protection against corrosions, comprising:
   providing a dispersion, in water, of a synthetic polymer and of a synthetic resin being absorbed on the surface of a blend of cement and sand particles for causing such a blend to remain fluid;
   providing a cement mortar which includes said dispersion and having a sand-to-cement ratio of from 1 to 3 and water-to-cement ratio of from 0.25 to 0.35, solids in the dispersion being present from 3 to 30 parts by weight per 100 parts of cement;
   applying the cement mortar with dispersion as provided to the interior of the pipe; and
   providing high-speed rotation to the pipe to obtain centrifugal action on the mortar as applied and to compact therewith the said mortar to obtain a dense corrosion-proof and corrosion-proofing interior lining for and on the pipe.
2. A method as in claim 1, the polymer being an acrylic resin, the synthetic resin being melamine resin.
3. A method as in claim 1, including the step of using a relatively low speed at first for distributing the blend over the surface, followed by a high-speed rotation for obtaining the compacting.
4. A method as in claim 3, the low speed being approximately 140 to 240 RPM's, the high speed being in the range of from 400 to 750 RPM's.
5. A method as in claim 1, wherein the high-speed rotation is selected to subject the lining to an acceleration in excess of 20 g's.
6. A method as in claim 1 and including the step of adding a puzzuolamic filler to the blend.
7. A method as in claim 6, the filler being provided at a relative content of 5 to 30 parts by weight per 100 parts of cement.
8. A method as in claim 1 or 5 and including the step of imparting a radial vibration upon the pipe.

* * * * *